United States Patent
Henderson et al.

(10) Patent No.: US 8,867,415 B2
(45) Date of Patent: Oct. 21, 2014

(54) SYSTEM AND METHOD FOR EXTENDING COMMUNICATION COVERAGE IN A WIRELESS NETWORK

(75) Inventors: Gregory Henderson, Sudbury, MA (US); Lung Chan, Somerville, MA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 916 days.

(21) Appl. No.: 12/704,100

(22) Filed: Feb. 11, 2010

(65) Prior Publication Data

US 2011/0194469 A1    Aug. 11, 2011

(51) Int. Cl.
*H04J 1/00* (2006.01)
*H04W 16/12* (2009.01)

(52) U.S. Cl.
CPC .................................. *H04W 16/12* (2013.01)
USPC ............ 370/281; 370/279; 370/280; 370/315

(58) Field of Classification Search
CPC .......... H04B 1/50; H04B 1/56; H04B 7/2606; H04B 7/15507
See application file for complete search history.

(56) References Cited

U.S. PATENT DOCUMENTS

| | | | |
|---|---|---|---|
| 4,829,554 A * | 5/1989 | Barnes et al. | 455/432.1 |
| 5,890,055 A * | 3/1999 | Chu et al. | 455/16 |
| 2002/0058513 A1* | 5/2002 | Klein et al. | 455/447 |
| 2008/0219189 A1 | 9/2008 | Kitchin et al. | 370/277 |
| 2008/0219216 A1 | 9/2008 | Taaghol et al. | 370/331 |
| 2009/0207761 A1* | 8/2009 | Tangemann et al. | 370/281 |
| 2009/0207762 A1 | 8/2009 | Jalloul et al. | 370/281 |

FOREIGN PATENT DOCUMENTS

| | | | |
|---|---|---|---|
| CN | 101365185 | 2/2009 | |
| EP | 1565017 | 12/2004 | |
| EP | 1786217 A1 * | 5/2007 | H04Q 7/30 |
| WO | 2008/080079 | 7/2008 | |
| WO | 2009134178 | 11/2009 | |
| WO | 2010/002100 | 1/2010 | H04W 88/10 |

OTHER PUBLICATIONS

Schoenin et al. *MAC Performance of a 3GPP-LTE Mulithop Cellular Network*, IEEE International Conference on Communications, May 2008.
Proxim Wireless Position Paper *Advantages of Time Division Duples (TDD) for Broadband Wireless in Last-Mile Application*: Proxim Wireless Corporation Copyright 2006.
Proxim Wireless Position Paper *Benefits of TDD in WiMAX Systems*: Proxim Wireless Corporation: Copyright 2005.
Ericsson et al., "Text proposal to correct relaying text in TR36.814 and TR36.912, R-1-100801" 3GPP TSG RAN WG1 Meeting #59bis, Valencia, Spain, Jan. 2010, pp. 1-7.
Hoymann, "LTE-Advanced: Self-backhauling for cost reduction", Ericsson Research, Nov. 2008, pp. 1-10.

* cited by examiner

*Primary Examiner* — Kibrom T Hailu
*Assistant Examiner* — James P Duffy
(74) *Attorney, Agent, or Firm* — Allen, Dyer, Doppelt, Milbrath & Gilchrist, P.A.

(57) ABSTRACT

A wireless communication system may include a first base station having a first communication coverage area and operating in an HFDD mode using a first frequency and a second frequency in an alternating pattern. The system may also include a second base station having a second communication coverage area different than the first communication coverage area and also operating in an HFDD mode. The second base station may communicate using the first frequency and the second frequency in an opposite alternating pattern from the first base station.

12 Claims, 2 Drawing Sheets

HP SITE (HP TO UE AND HP TO PICOCELL)

PICOCELL INBOUND (HP TO PICOCELL)

OUTBOUND (PICOCELL TO UE2)

SYSTEM AND METHOD FOR EXTENDING COMMUNICATION COVERAGE IN A WIRELESS NETWORK

FIELD OF THE INVENTION

The subject matter disclosed herein relates generally to wireless communication systems, and more particularly, to frequency division duplex (FDD) wireless networks, such as half duplex FDD (HFDD) wireless networks.

BACKGROUND OF THE INVENTION

The use of broadband wireless networks, such as third-generation (3G) and fourth generation (4G) mobile broadband networks, continues to expand. Users of these wireless networks can move to different locations (communication cells) in a coverage area and maintain network connectivity. These networks are typically configured having base stations with a certain wireless communication range to define a coverage area. The base stations may be connected to a wired network using, for example, a high-speed network connection such as fiber optics, T1, DSL, cable modem, etc. The communication path in these wireless networks is typically from (i) a mobile user to a base station across the wireless link and (ii) from the base station to the network (e.g., wide area network (WAN)) using a wired or high bandwidth wireless (e.g., microwave) connection. Thus, a mobile device (e.g., cellular telephone or land mobile radio) communicates with the network via one or more wireless base stations.

As the communication rates of these wireless networks increases, such as in the 4G networks, higher communication capacity is provided resulting in lower cell footprints. Accordingly, a large number of cells (e.g., picocells) are needed, each of which needs a backhaul connection. When employing a half duplex frequency division duplex (HFDD) mode in wireless networks, self-backhauling of the cell may be provided using the same protocol and frequencies. Also, the radio units for HFDD wireless networks are simpler to design because the units do not have to transmit and receive at the same time. However, a loss of communication capacity and communication throughput in the network results because bi-directional communication can only be provided in one direction at a time and not simultaneously (as in full-duplex communications). Accordingly, half of the communication capacity is lost.

One exemplary HFDD system is set forth in U.S. Patent Publication No. 2009/0207762. This reference discloses a method for assigning mobile users in a half-frequency division duplex (HFDD) system to a first UL group and second UL group of an uplink (UL) sub-frame, and to a first DL group and a second DL group of a downlink (DL) sub-frame. The UL sub-frame is assigned a first carrier frequency and the DL sub-frame is assigned a second carrier frequency. The method includes determining a type of data, determining a receive CINR (carrier interference plus noise ratio), and determining a Doppler frequency parameter, for each mobile user of a plurality of mobile users. The plurality of mobile users are assigned to the first UL group and/or the second UL group time durations of the first and second UL groups, and based on at least one of the data type, CINR, Doppler frequency spread of the mobile user, and a number of mobile users previously assigned to the first and second UL groups.

SUMMARY OF THE INVENTION

A wireless communication system may include a first base station having a first communication coverage area and operating in an HFDD mode using a first frequency and a second frequency in an alternating pattern. The system may also include a second base station having a second communication coverage area different than the first communication coverage area and also operating in an HFDD mode. Furthermore, the second base station may communicate using the first frequency and the second frequency in an opposite alternating pattern from the first base station.

More particularly, the second base station may comprise a picocell base station having a first radio and a second radio. Moreover, the system may further include at least one wireless communications device, and the first radio may communicate with the at least one wireless communications device. The second radio may communicate with the first base station. Further, the first and second radios may transmit simultaneously and receive simultaneously. Additionally, the first and second radios may be connected together at a network protocol layer.

The first base station and the second one base station may transmit during different HFDD frames. In addition, the system may further include a plurality of wireless communications devices registered with the first base station or the second base station. As such, each wireless communications device may be assigned a respective HFDD frame for communication based upon whether it is registered to the first base station or the second base station.

By way of example, the first base station and the second base station may be connected in a Long Term Evolution (LTE) network. Furthermore, the second base station may comprise a picocell base station, and the first base station may comprise a master base station configured to communicate with the picocell base station. Additionally, the picocell base station may comprise a first radio and a second radio, and the second radio may register with the master base station to provide self-backhauling.

A related wireless communications method may include operating a first base station having a first communication coverage area in a half duplex frequency division duplex (HFDD) mode using a first frequency and a second frequency in an alternating pattern. The method may further include operating a second base station having a second communication coverage area different than the first communication coverage area also in an HFDD mode to communicate using the first frequency and the second frequency in an opposite alternating pattern from the first base station.

DETAILED DESCRIPTION OF THE PREFERRED EMBODIMENTS

Figure 1:
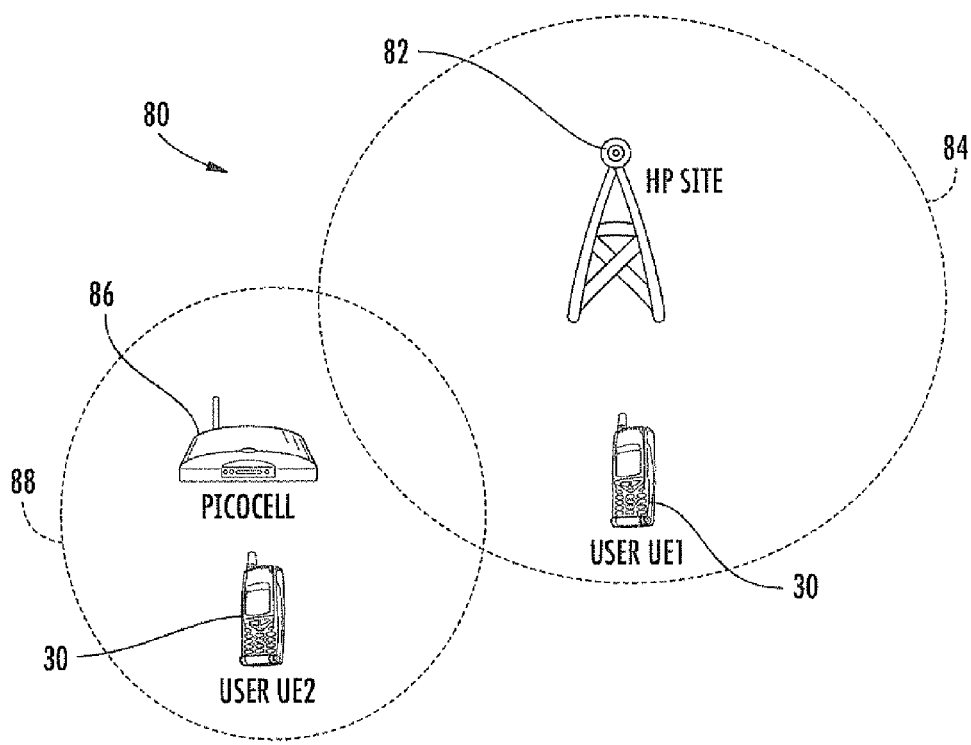
FIG. 1 is a diagram illustrating a wireless communication system with a picocell in which communication coverage extension and picocell self-backhaul is provided in accordance with various embodiments of the invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between system components or hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding a plurality of elements or steps, unless otherwise indicated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally speaking, an approach for extending the coverage of wireless networks through the use of an HFDD network is set forth herein, in which picocell base stations are deployed to reuse the TX/RX frequencies from a master base station. The picocell base station uses a frame synchronization that is opposite of the master base station, thus reducing interference between the master base station communications and the picocell communications. Further, the use of an HFDD network with this frame synchronization allows for the picocell to self-backhaul its data to the master base station.

Figure 2:
FIG. 2 is a series of transmit and receive sequence diagrams generated in accordance with various embodiments of the invention.
Figure 2:
Figure 2:
Figure 2:

More particularly, as shown in FIGS. 1 and 2, an HFDD wireless system 80 is provided that uses two frequencies, where one frequency is used for downlink (DL) communication and the other frequency is used for uplink (UL) communication. Although the wireless system 80 is shown as part of an LTE network operating in the FDD spectrum (e.g., 700 MHz spectrum), this is merely for illustration and need not be the case in all embodiments, as noted above. For example, operation may also be in accordance with other FDD wireless protocols, such as IEEE 802.16 or WiMAX, as will be appreciated by those skilled in the art. The wireless system 80 includes a first (or master) base station(s) 82 illustrated as a communication site, namely a high profile (HP) site, and having a communication coverage area 84. The HP site 82 uses a first frequency (channel) for DL communication and a second frequency (channel) for UL communication.

The wireless system is operated in an HFDD mode such that the HP site 82 transmits on the DL or receives on the UL, but not at the same time. Accordingly, simultaneous communications to and from the HP site 82 are not provided. However, the HFDD communication allows for a simplified design of user equipment (UE) 30 (e.g., mobile devices) because the UEs do not have to simultaneously transmit and receive, but can perform these operations in sequence. It should be noted that with respect to communications with the HP site 82 in HFDD, fifty percent of the time the air link is silent and not communicating data as described in more detail below.

The wireless system 80 also includes a second base station (s) 86 illustrated as a picocell base station (with two radios) and having a communication coverage area 88 covering a different (e.g., smaller) region than the communication coverage area 84 of the HP site 82. The communication coverage areas 84 and 88 may overlap. The base station 86 is configured as a coverage-extension base station to transmit on the DL and receive on the UL in the opposite frame synchronization of the HP site 82. Accordingly, full utilization of the DL and UL channels are provided.

For example, as illustrated in FIG. 2, the HP site 82 transmits when the base station 86 is silent (i.e., not transmitting) and the base station 86 transmits when the HP site 82 is silent. It should be noted that each block illustrated in FIG. 2 represents one-half of a frame, for example, one-half of an HFDD communication frame. The transmit sequence 90 and receive sequence 92 represent transmissions and receptions, respectively, of the HP site 82. The transmit sequence 96 and receive sequence 94 represent receptions and transmissions, respectively, of inbound communications to the base station 86, namely communications of any UE connecting to the HP site 82. It should be noted that the base station 86 may be considered a UE when communicating with the HP site 82 in some implementations. The transmit sequence 98 and receive sequence 100 represent transmissions and receptions, respectively, of outbound communications from the base station 86.

In operation, the HP site 82 and picocell base station 86 can communicate using the same set of frequencies, for example, the same downlink (DL) frequency and uplink (UL) frequency, but out of phase, namely by one-half of a frame by assigning a different phase to communications from each of the HP site 82 and the base station 86. It should be noted that the UL and DL frequencies may be in a various spectrums, such as the 700 MHz frequency spectrum, for example.

Thus, self-interference is avoided between the HP site 82 and the picocell base station 86. For example, referring again to FIG. 1, when the HP site 82 is transmitting on the DL frequency to the UE 30 (UE1), there is no other TX on the DL channel. Likewise, when the UE 30 (UE1) is transmitting on the UL frequency to the HP site 82, there is no other device transmitting on the UL channel. Accordingly, interference in picocell deployments is managed without requiring that a carrier have a separate channel for picocell use.

Moreover, the system 80 also advantageously allows for the picocell 86 to self-backhaul messages from mobile clients, namely UEs 30 (UE2 in FIG. 2) by registering as a "mobile client" to the picocell. In this way, a single set of FDD frequencies (e.g., the DL/UL) can be used to provide both (i) picocell base station 86 to mobile communications, for example, to UE1 and (ii) backhaul for picocell to base station communications (e.g., base station 86 to HP site 82 communications). Because the picocell base station 86 has the opposite frame synchronization as the primary or master base station, namely the HP site 82, the two radios in the picocell (a first radio registered with the HP site 82 and essentially acting as a DE and a second acting as a coverage extension base station) do not have self-interference. For example, as illustrated in FIG. 2, both radios in the base station 86 transmit at the same time and receive at the same time. The two radios in the base station 86 may be connected together at a higher layer in the protocol, such as the network layer, so that packets from the end devices (e.g., UE2 in FIG. 5) are forwarded through the base station 86 to the HP site 82, and thus the network. It should be noted that the coverage extension provided by the various embodiments may be repeated to provide multiple extensions of coverage.

Figure 3:
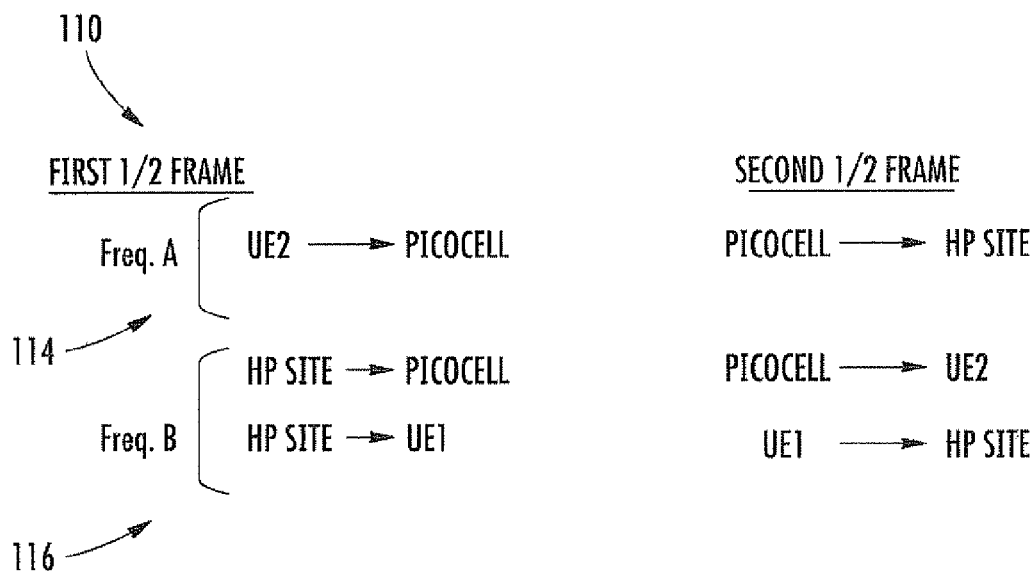
FIG. 3 is a matrix diagram illustrating synchronized communications in accordance with various embodiments of the invention.

As shown in FIG. 3, synchronization using the same frequency and different phase may be provided. As illustrated in the example, in HFDD communications are divided into portions, such as half-frames, identified as a first ½ frame 110 and a second ½ frame 112. Additionally, within each ½ frame 110 and 112, two frequencies may be used, identified as Frequency A 114 and Frequency B 116, respectively, which may correspond to UL and DL frequencies. The picocell base station 86 essentially operates as a repeater that is self-backhauled, whereas UE2 (that is registered with the picocell) transmits to the picocell base station on the first ½ frame 110 using Frequency A 114, and the picocell transmits to the HP site on the second ½ frame 112 using Frequency A 114, i.e., in an alternating pattern. Likewise, the HP site 82 transmits to the picocell base station 86 on the first ½ frame 110 using Frequency B 116, and the picocell base station transmits to UE2 on the second ½ frame 112 using Frequency B 116.

Moreover, other synchronized transmissions may be provided. For example, the HP site may transmit to UE1 on the first frame 110 using Frequency B 116, and UE1 may transmit to the HP site on the second frame 112 using Frequency B 116.

Figure 4:
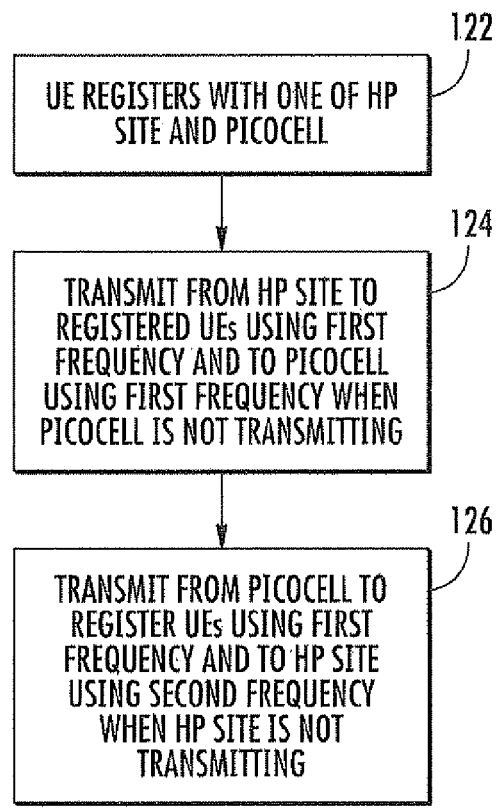
FIG. 4 is flowchart of a method for controlling synchronized communications in accordance with various embodiments of the invention.

Control of the synchronized communication may be provided with the method 120 shown in FIG. 4. Specifically, at Block 122 one or more UEs within the communication range of the HP site 82 and/or the picocell base station 86 register with the HP site or picocell base station. Once registered, the HP site or picocell base station controls communication traffic to and from the registered UE. Thereafter, synchronized communications are provided. In particular, at Block 124 voice/data is transmitted from the HP site to the registered UEs using a first frequency and to the picocell using the same frequency when the picocell is silent (not transmitting). Also, at Block 126 voice/data is transmitted from the picocell to the registered UEs using the first frequency, and to the HP site using the second frequency when the HP site is silent (not transmitting). It should be noted that the transmissions at 124 and 126 may be performed in different orders, for example, with the transmissions at 126 occurring before the transmissions at 124.

Thus, picocells in an HFDD network are used wherein the picocell is synchronized in the opposite frame to the HP site. Using the synchronization described herein, self-interference between picocell to mobile communication and HP to mobile communication (and vice-versa) may be eliminated. Further, using the synchronization allows the picocell to have a second radio that can register with the HP site and provide a path for self-backhaul of the picocell using the UL/DL channels to the HP site. Since these transmissions are synchronized, this second radio will be able to self-backhaul without interfering with other UE transmissions. Additionally, using the synchronization with HFDD allows the network to operate with HFDD radios, while using the complete capacity of the FDD channel.

It should be noted that the various embodiments of the invention are not limited to extending the communication range in a cellular communication system, but may be implemented in connection with different communication networks or systems wherein, for example, communication coverage extension is desired or needed. Also, communication range extension may be implemented in connection with different cellular networks, for example, an Enhanced Data Rates for GSM Evolution (EDGE) network, Code Division Multiple Access (CDMA) network, Universal Mobile Telecommunications System (UMTS) network or a W-CDMA (Wideband Code Division Multiple Access) network.

The various embodiments or components, for example, the communication system or controllers therein, may be implemented as part of one or more computer systems. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar devices for loading computer programs or other instructions into the computer system.

As used herein, the term "computer" may include processor-based or microprocessor-based systems, such as systems using microcontrollers, reduced instruction set circuits (RISC), application specific integrated circuits (ASICs), logic circuits, or other circuits or processors capable of executing the functions described herein. The above examples are exemplary only, and are thus not intended to limit in any way the definition and/or meaning of the term "computer".

The computer system executes a set of instructions that are stored in one or more storage elements, to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program, or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using devices or systems and performing associated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

That which is claimed is:

1. A wireless communication system for use with a plurality of registered wireless communications devices, and comprising:
   a first base station having a first communication coverage area and operating in a half duplex frequency division duplex (HFDD) mode using a first frequency and a second frequency in an alternating pattern; and
   a picocell base station, having a first radio and a second radio, and having a second communication coverage area different than the first communication area and also operating in an HFDD mode;
   the plurality of wireless communications devices being registered with said first base station or said picocell base station, and wherein each wireless communications device is assigned a respective HFDD frame for communication based upon whether it is registered to said first base station or said picocell base station;
   said picocell base station communicating using the first frequency and the second frequency in an opposite alternating pattern from said first base station wherein said first and second radios transmit simultaneously and receive simultaneously, wherein said first radio communicates with said at least one wireless communications device, and said second radio communicates with said, first base station.

2. The wireless communication system of claim 1 wherein the first and second radios are connected together at a network protocol layer.

3. The wireless communication system of claim 1 wherein said first base station and said picocell base station transmit during different HFDD frames.

4. The wireless communication system of claim 1 wherein said first base station and said picocell base station are connected in a Long Term Evolution (LTE) network.

5. The wireless communication system of claim 1 wherein said first base station comprises a master base station.

6. The wireless communication system of claim 5 wherein said second radio registers with said master base station to provide self-backhauling.

7. A wireless communication system comprising:
   a master base station having a first communication coverage area and operating in a half duplex frequency division duplex (HFDD) mode using a first frequency and a second frequency in an alternating pattern;
   a plurality of wireless communications devices;
   a plurality of base stations each comprising a first radio configured to communicate with said plurality of wireless communications devices, and a second radio configured to communicate with said master base and said first and second radios transmit simultaneously and receive simultaneously;
   the plurality of wireless communications devices being registered with said first base station or said picocell base station, and wherein each wireless communications device is assigned a respective HFDD frame for communication based upon whether it is registered to said first base station or said picocell base station;
   each picocell base station having a second communication coverage area different than the communication coverage area and also operating in an HFDD mode;
   said picocell base stations communicating using the first frequency and the second frequency in an opposite alternating pattern from said master base station.

8. The wireless communication system of claim 7 wherein said master base station and said plurality of picocell base stations transmit during different HFDD frames.

9. The wireless communication system of claim 7 wherein said second radio of each picocell base station registers with said master base station to provide self-backhauling.

10. A wireless communications method comprising:
    operating a first base station having a first communication coverage area in a half duplex frequency division duplex (HFDD) mode using a first frequency and a second frequency in an alternating pattern; and
    operating a picocell base station, having a first radio and a second radio, and having a second communication coverage area different than the first communication area and also operating in an HFDD mode to communicate using the first frequency and the second frequency in an opposite alternating pattern from said first base station, wherein said first and second radios transmit simultaneously and receive simultaneously, including using the first radio to communicate with at least one wireless communications device, and using the second radio to communicate with the first base station;
    registering a plurality of wireless communications devices with the first base station or the picocell base station; and
    assigning a respective HFDD frame for communication based upon whether it is registered to said first base station or said picocell base station.

11. The method of claim 10 wherein the first base station comprises a master base station.

12. The method of claim 11 further comprising registering each second radio with the master base station to provide self-backhauling.

* * * * *